US010759521B2

(12) United States Patent
McMahon et al.

(10) Patent No.: US 10,759,521 B2
(45) Date of Patent: Sep. 1, 2020

(54) ROTATABLE WING TIP JOINT AND METHOD OF MAKING SAME

(71) Applicant: The Boeing Company, Chicago, IL (US)

(72) Inventors: Timothy James McMahon, Creve Coeur, MO (US); John Scott Kruse, Florissant, MO (US); Adam L. Kehrer, Bridgeton, MO (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 15/675,954

(22) Filed: Aug. 14, 2017

(65) Prior Publication Data

US 2017/0361922 A1    Dec. 21, 2017

Related U.S. Application Data

(62) Division of application No. 14/458,337, filed on Aug. 13, 2014, now Pat. No. 9,868,517.

(51) Int. Cl.
*B64C 23/06* (2006.01)
*B64C 5/08* (2006.01)
*B64C 3/38* (2006.01)

(52) U.S. Cl.
CPC ............. *B64C 23/065* (2013.01); *B64C 3/38* (2013.01); *B64C 5/08* (2013.01); *B64C 23/072* (2017.05); *Y02T 50/162* (2013.01); *Y02T 50/164* (2013.01)

(58) Field of Classification Search
CPC ....... B64C 23/065; B64C 23/072; B64C 5/08; B64C 3/38; Y02T 50/164; Y02T 50/162
See application file for complete search history.

(56) References Cited

U.S. PATENT DOCUMENTS

| | | | |
|---|---|---|---|
| 1,466,551 A | 8/1923 | Thurston | |
| 1,888,418 A | 11/1932 | Adams | |
| 2,166,564 A | 7/1939 | Atwood et al. | |
| 3,785,594 A | 1/1974 | Lee | |
| 4,247,065 A * | 1/1981 | Grob | B64C 3/48 16/275 |
| 4,671,473 A * | 6/1987 | Goodson | B64C 23/076 244/199.4 |
| 5,356,094 A * | 10/1994 | Sylvain | B64C 3/56 244/123.9 |
| 5,381,986 A | 1/1995 | Smith et al. | |

(Continued)

FOREIGN PATENT DOCUMENTS

GB    2533413 A    6/2016

*Primary Examiner* — Valentina Xavier
(74) *Attorney, Agent, or Firm* — Armstrong Teasdale LLP (57) ABSTRACT

A joint for coupling a wing tip to a wing base includes a linking member that extends from a first end to a second end. The linking member first end is coupleable to the wing base, and the linking member second end is coupleable to the wing tip. The linking member defines first second hinge lines that are substantially parallel. The joint also includes at least one actuator. A first end of each at least one actuator is coupled to the linking member, and a second end of each at least one actuator is coupleable to one of the wing base and the wing tip. The at least one actuator is operable to rotate the wing tip about the first and second hinge lines between a first orientation and a second orientation relative to the wing base.

20 Claims, 8 Drawing Sheets

(56) References Cited

U.S. PATENT DOCUMENTS

| | | |
|---|---|---|
| 5,558,299 A | 9/1996 | Veile |
| 5,988,563 A | 11/1999 | Allen |
| 6,076,766 A * | 6/2000 | Gruensfelder ............ B64C 3/56 |
| | | 244/130 |
| 6,227,487 B1 | 5/2001 | Clark |
| 6,345,790 B1 | 2/2002 | Brix |
| 6,481,667 B1 | 11/2002 | Ho |
| 7,275,722 B2 | 10/2007 | Irving et al. |
| 8,083,185 B2 | 12/2011 | Konings et al. |
| 2004/0262451 A1 | 12/2004 | McLean |
| 2005/0133672 A1 | 6/2005 | Irving et al. |
| 2006/0027703 A1 | 2/2006 | Bussom et al. |
| 2006/0108469 A1 | 5/2006 | Elam |
| 2010/0019080 A1* | 1/2010 | Schweighart ............ B60F 5/02 |
| | | 244/49 |
| 2010/0224734 A1 | 9/2010 | Grip |
| 2013/0001367 A1 | 1/2013 | Boer et al. |
| 2013/0313356 A1* | 11/2013 | Santini ..................... B64C 3/56 |
| | | 244/49 |
| 2015/0047337 A1 | 2/2015 | Gandhi |
| 2015/0151830 A1* | 6/2015 | Xi ............................ B64C 3/54 |
| | | 244/47 |
| 2016/0176502 A1 | 6/2016 | Snook |
| 2016/0176506 A1 | 6/2016 | Cross |

\* cited by examiner

ROTATABLE WING TIP JOINT AND METHOD OF MAKING SAME

CROSS REFERENCE TO RELATED APPLICATIONS

This application is a divisional and claims priority to U.S. patent application Ser. No. 14/458,337 filed Aug. 13, 2014 for "ROTATABLE WING TIP JOINT AND METHOD OF MAKING SAME", now issued as U.S. Pat. No. 9,868,517, which is hereby incorporated by reference in its entirety.

BACKGROUND

The field of the disclosure relates generally to rotatable wing tip joints, and, more particularly, to systems and methods for rotating a wing tip while maintaining an aerodynamic wing surface.

At least some known aircraft include wings with rotatable wing tips. Such rotatable wing tips may be utilized, for example, as a stabilization and/or control surface of the aircraft. Such rotatable wing tips typically rotate relative to a wing base about a hinge mechanism.

At least some known hinge mechanisms are at least partially exposed to surrounding air flow when the wing tip is rotated. However, such an exposed hinge mechanism tends to create adverse aerodynamic effects. Such aerodynamic effects may be exacerbated under certain flight conditions, such as, for example, when the aircraft operates at supersonic speeds. Alternatively, at least some known wings with rotatable wing tips include a flexible skin that extends between the wing base and the wing tip, such that it covers the hinge mechanism when the wing tip is rotated. However, the flexible skin tends to crease and wrinkle around the hinge mechanism when the wing tip is rotated, which tends to create adverse aerodynamic effects such as, for example, when the aircraft operates at supersonic speeds.

BRIEF DESCRIPTION

In one aspect, a joint for coupling a wing tip to a wing base is provided. The joint includes a linking member that extends from a first end to a second end. The linking member first end is coupleable to the wing base, and the linking member second end is coupleable to the wing tip. The linking member defines a first hinge line and a second hinge line, and the first hinge line and said second hinge line are substantially parallel. The joint also includes at least one actuator. A first end of each at least one actuator is coupled to the linking member, and a second end of each at least one actuator is coupleable to one of the wing base and the wing tip. The at least one actuator is operable to rotate the wing tip about the first and second hinge lines between a first orientation and a second orientation relative to the wing base.

In another aspect, an aircraft is provided. The aircraft includes at least one wing that has a wing base and a wing tip. The aircraft also includes a linking member that extends from a first end to a second end. The linking member first end is coupled to the wing base, and the linking member second end is coupled to the wing tip. The linking member defines a first hinge line and a second hinge line, and the first hinge line and the second hinge line are substantially parallel. The aircraft further includes at least one actuator. A first end of each at least one actuator is coupled to the linking member, and a second end of each at least one actuator is coupled to one of the wing base and the wing tip. The at least one actuator is operable to rotate the wing tip about the first and second hinge lines between a first orientation and a second orientation relative to the wing base.

In another aspect, a method of coupling a wing base and a wing tip is provided. The method includes coupling a first end of a linking member to the wing base and coupling a second end of the linking member to the wing tip. The linking member defines a first hinge line and a second hinge line, and the first hinge line and the second hinge line are substantially parallel. The method also includes coupling a first end of at least one actuator to the linking member, and coupling a second end of each at least one actuator to one of the wing base and the wing tip. The at least one actuator is operable to rotate the wing tip about the first and second hinge lines between a first orientation and a second orientation relative to the wing base.

The features, functions, and advantages that have been discussed can be achieved independently in various embodiments or may be combined in yet other embodiments further details of which can be seen with reference to the following description and drawings.

DETAILED DESCRIPTION

Embodiments of the wing tip joint and method described herein provide for rotation of a wing tip relative to a wing base with reduced or eliminated adverse aerodynamic effect. The embodiments provide for rotation of the wing tip about two offset, substantially parallel hinge lines, rather than about a single axis. As such, when the wing tip is in a rotated state, a relatively large radius of curvature is imparted to a flexible skin that extends between the wing base and the wing tip. The relatively large radius of curvature reduces or eliminates creases and wrinkles in the flexible skin near the hinge lines, as compared to a similar amount of rotation at a single-hinged joint.

Figure 1:
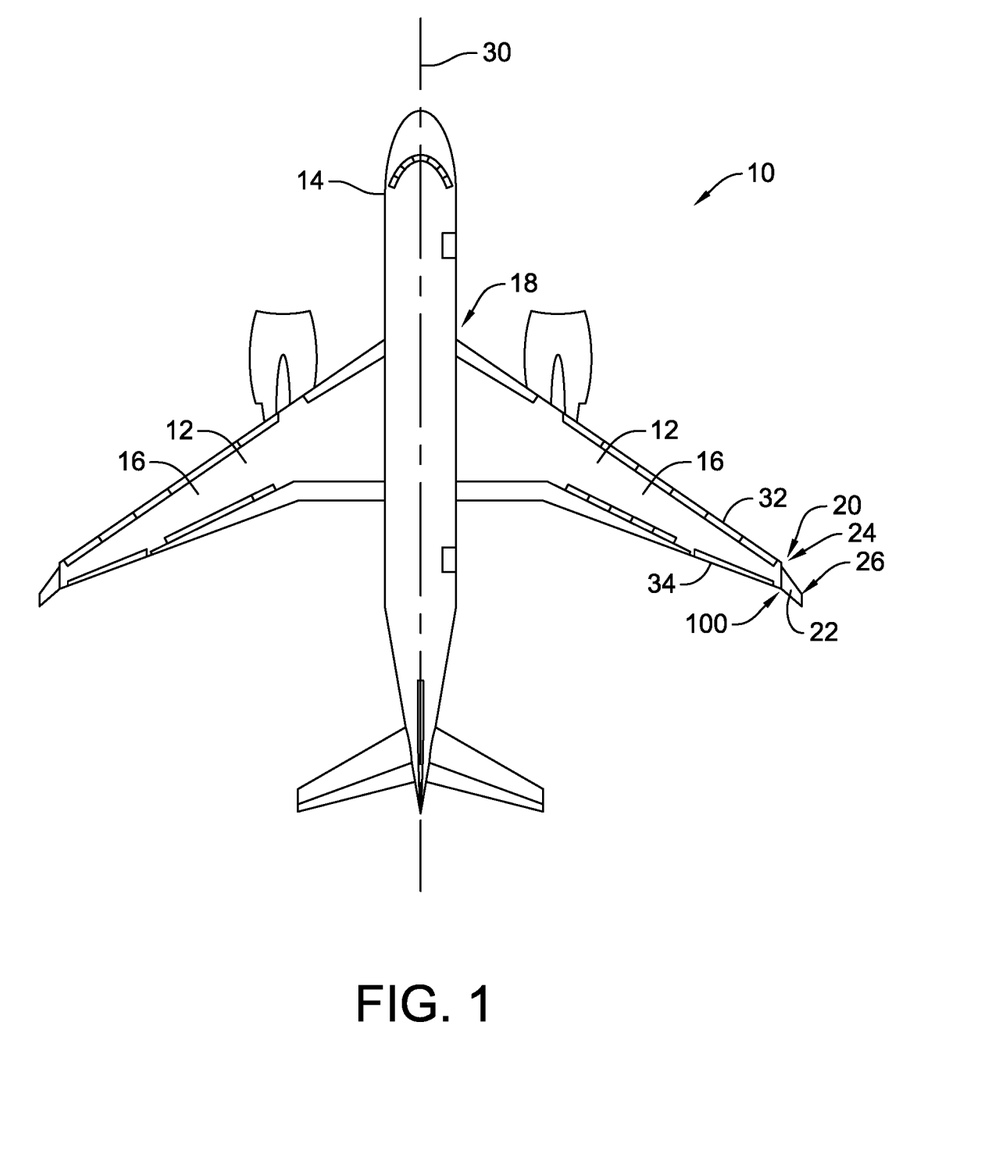
FIG. 1 is a schematic diagram of an exemplary aircraft.

Referring more particularly to the drawings, implementations of the disclosure may be described in the context of an aircraft 10 shown schematically in FIG. 1. Aircraft 10 includes at least one wing 12 that extends from a fuselage 14. The at least one wing 12 includes a wing base 16 that extends from a first end 18 to an opposing second end 20. Wing base first end 18 is coupled to fuselage 14.

The at least one wing 12 also includes a wing tip 22 that extends from a first end 24 to an opposing second end 26. Wing tip 22 is coupled to wing base 16 at a wing tip joint 100. More specifically, wing tip first end 24 is coupled to wing base second end 20 at wing tip joint 100, such that wing tip 22 is rotatable with respect to wing base 16. In the illustrated embodiment, wing tip 22 is rotatable with respect to wing base 16 about an axis generally parallel to a longitudinal axis 30 of fuselage 14. In alternative embodiments, wing tip 22 is rotatable with respect to wing base 16 about an axis that is not generally parallel to longitudinal axis 30.

Figure 2:
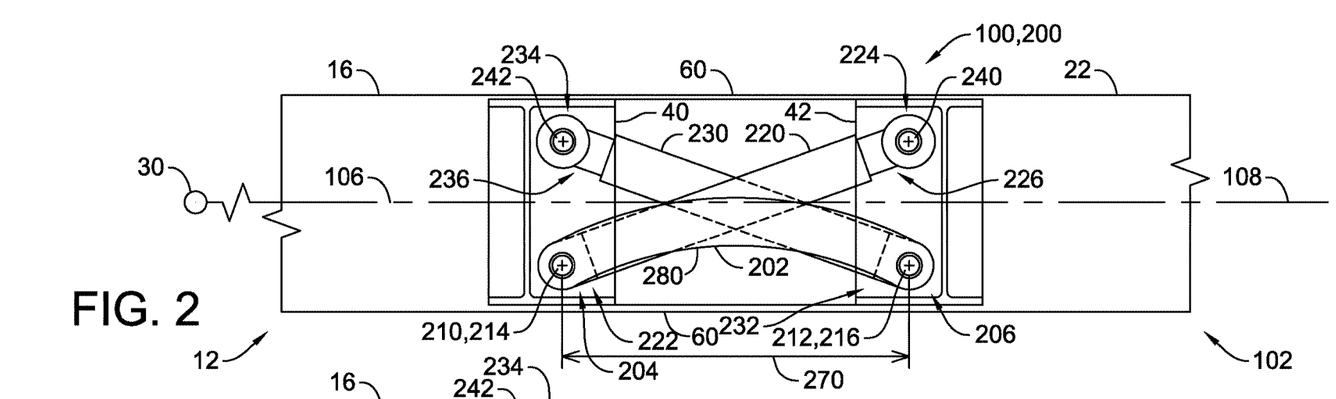
FIG. 2 is a schematic cross-sectional side view of a first embodiment of a wing tip joint that may be used with the aircraft shown in FIG. 1, with a wing tip in a first orientation.
Figure 3:
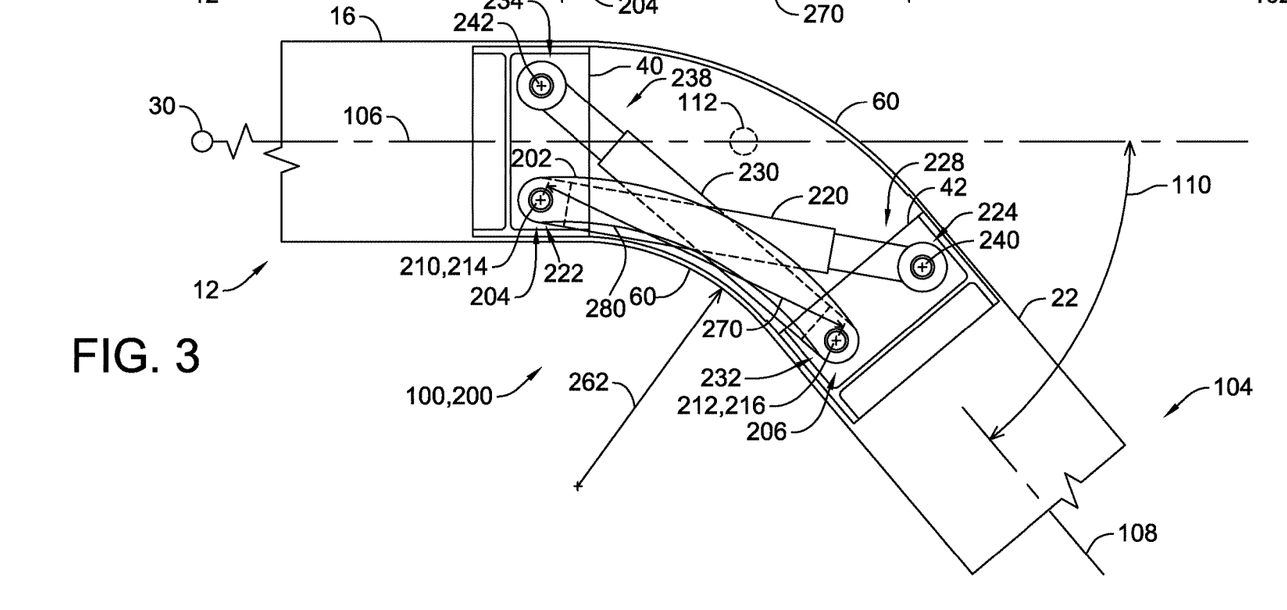
FIG. 3 is a schematic cross-sectional side view of the first embodiment of the wing tip joint shown in FIG. 2, with the wing tip in a second orientation.
Figure 4:
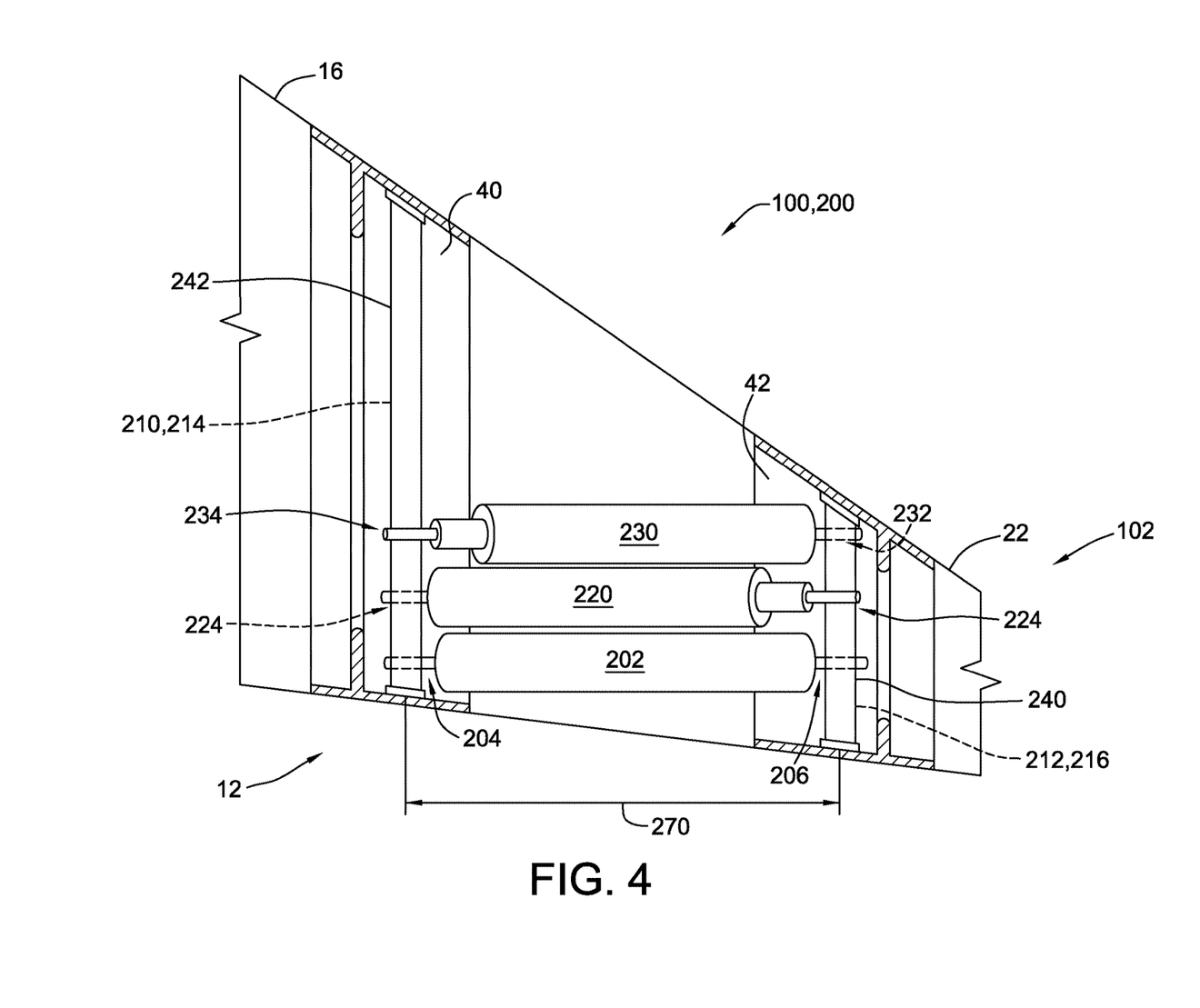
FIG. 4 is a schematic cross-sectional top view of the first embodiment of the wing tip joint shown in FIG. 2, with the wing tip in the first orientation.

FIG. 2 and FIG. 3 are schematic side cross-sectional views, and FIG. 4 is a schematic cross-sectional top view, of a first embodiment of wing tip joint 100, designated as wing tip joint 200, that may be used with, for example, aircraft 10. In FIG. 2 and FIG. 4, wing tip 22 is illustrated in a first orientation 102 relative to wing base 16. In FIG. 3, wing tip 22 is illustrated in a second orientation 104 relative to wing base 16. A flexible outer skin 60 of the at least one wing 12 extends over at least a portion of joint 200 between wing base 16 and wing tip 22.

With reference to FIGS. 2-4, in the illustrated embodiment, first orientation 102 is a neutral orientation, such that a spanwise axis 108 of wing tip 22 is substantially parallel to a spanwise axis 106 of wing base 16. In alternative embodiments, first orientation 102 is other than a neutral orientation, such that spanwise axis 108 of wing tip 22 is not substantially parallel to spanwise axis 106 of wing base 16.

In second orientation 104, wing tip 22 is rotated by an angle 110 relative to first orientation 102. Angle 110 is defined about an axis 112 that generally lies within a plane defined by wing 12. In certain embodiments, axis 112 is substantially parallel to a line drawn from any point on a leading edge 32 of the at least one wing 12 to any point on a trailing edge 34 of the at least one wing 12. In the illustrated embodiment, axis 112 is substantially parallel to longitudinal axis 30 (which extends out of the page in the view shown in FIGS. 2 and 3).

In certain embodiments of joint 100, such as joint 200, wing tip 22 is configured to rotate from first orientation 102 in a generally downward direction towards second orientation 104. For example, in the illustrated embodiment, wing tip 22 is configured to rotate generally towards the ground from first orientation 102 to second orientation 104 when aircraft 10 (shown in FIG. 1) is in a typical operating condition. In alternative embodiments, wing tip 22 is configured to rotate from first orientation 102 in a generally upward direction towards second orientation 104.

In certain embodiments of joint 100, such as joint 200, wing tip 22 is rotatable to a maximum angle 110 that facilitates improved control of aircraft 10 (shown in FIG. 1) in a selected operating condition, such as, but not limited to, a supersonic operating condition. For example, in some embodiments, wing tip 22 is rotatable to a maximum angle 110 in a range of from about 10 degrees to about 65 degrees. Moreover, in certain embodiments, wing tip 22 is rotatable to a maximum angle 110 in a range of from about 40 degrees to about 55 degrees. In a particular embodiment, wing tip 22 is rotatable to a maximum angle 110 of about 50 degrees.

Embodiments of joint 100, such as joint 200, enable wing tip 22 to move between first orientation 102 and second orientation 104 other than by a simple rotation about a single axis, such as axis 112. For example, in the illustrated embodiment, joint 200 includes a linking member 202. Linking member 202 extends from a first end 204 to a second end 206. Linking member first end 204 is configured to be coupled to wing base 16, and linking member second end 206 is configured to be coupled to wing tip 22. More specifically, in the illustrated embodiment, linking member first end 204 is rotatably coupled to a rib 40 of wing base 16, and linking member second end 206 is rotatably coupled to a rib 42 of wing tip 22. The rotatable coupling of linking member first end 204 to wing base 16 defines a first hinge line 210, and the rotatable coupling of linking member second end 206 to wing tip 22 defines a second hinge line 212.

First hinge line 210 and second hinge line 212 are substantially parallel and offset from each other by a distance 270. In particular, first hinge line 210 and second hinge line 212 each are substantially parallel to axis 112. In an embodiment, first hinge line 210 is a first pin joint 214 that rotatably couples linking member first end 204 to wing base 16, and second hinge line 212 is a second pin joint 216 that rotatably couples linking member second end 206 to wing tip 22. In alternative embodiments, first hinge line 210 and second hinge line 212 each are defined by any suitable coupling between linking member 202 and wing base 16 and wing tip 22, respectively, that enables joint 200 to function as described herein.

Joint 200 further includes a first actuator 220 and a second actuator 230 that are operable to rotate wing tip 22 about first hinge line 210 and second hinge line 212 between first orientation 102 and second orientation 104. First actuator 220 includes a first end 222, and a second end 224 that is linearly extendable relative to first end 222. The extension of second end 224 relative to first end 222 is controllable, such as by a suitable control system (not shown) of aircraft 10 (shown in FIG. 1). Similarly, second actuator 230 includes a first end 232 and a second end 234 that is linearly extendable relative to first end 232, and the extension of second end 234 relative to first end 232 is controllable.

In an embodiment, each of first actuator 220 and second actuator 230 are hydraulic actuators. In another embodiment, at least one of first actuator 220 and second actuator 230 is a pneumatic actuator. In another embodiment, at least one of first actuator 220 and second actuator 230 is an electric actuator. In alternative embodiments, each of first actuator 220 and second actuator 230 is any suitable actuator that enables joint 200 to function as described herein.

In FIG. 2, first actuator 220 is illustrated in a first state 226 wherein first actuator second end 224 is at a first position relative to first actuator first end 222, and second actuator 230 is illustrated in a first state 236 wherein second actuator second end 234 is at a first position relative to second actuator first end 232. In FIG. 3, first actuator 224 is illustrated in a second state 228 wherein first actuator second end 224 is at a second position relative to first actuator first end 222, and second actuator second end 234 is illustrated in a second state 238 wherein second actuator second end 234 is at a second position relative to second actuator first end 232. In the illustrated embodiment, actuators 220 and 230 in respective second states 228 and 238 have respective second ends 224 and 234 that are extended relative to respective first states 226 and 236.

First actuator first end 222 is coupled, at least indirectly, to linking member 202. More specifically, in the illustrated embodiment, first actuator first end 222 is rotatably coupled to wing base 16 at first hinge line 210, such that first actuator first end 222 is at least indirectly coupled to linking member 202 through first hinge line 210. In the illustrated embodiment, first actuator first end 222 is coupled to rib 40 at first pin joint 214. In an alternative embodiment, first actuator first end 222 is coupled to wing base 16 at a separate pin joint (not shown) that has an axis of rotation substantially parallel to first pin joint 214. In other alternative embodiments, first actuator first end 222 is coupled to linking member 202 by any suitable coupling that enables joint 200 to function as described herein. Additionally, first actuator second end 224 is coupled to wing tip 22. In the illustrated embodiment, first actuator second end 224 is rotatably coupled to rib 42 at a third pin joint 240. In other alternative embodiments, first actuator second end 224 is coupled to wing tip 22 by any suitable coupling that enables joint 200 to function as described herein.

Second actuator first end 232 is coupled, at least indirectly, to linking member 202. More specifically, in the illustrated embodiment, second actuator first end 232 is rotatably coupled to wing tip 22 at second hinge line 212, such that second actuator first end 232 is at least indirectly coupled to linking member 202 through second hinge line 212. In the illustrated embodiment, second actuator first end 232 is coupled to rib 42 at second pin joint 216. In an alternative embodiment, second actuator first end 232 is coupled to wing tip 22 at a separate pin joint (not shown) that has an axis of rotation substantially parallel to second pin joint 216. In other alternative embodiments, second actuator first end 232 is coupled to linking member 202 by any suitable coupling that enables joint 200 to function as described herein. Additionally, second actuator second end 234 is coupled to wing base 16. In the illustrated embodiment, second actuator second end 234 is rotatably coupled to rib 40 at a fourth pin joint 242. In other alternative embodiments, second actuator second end 234 is coupled to wing base 16 by any suitable coupling that enables joint 200 to function as described herein.

As illustrated in FIG. 2, first actuator 220 and second actuator 230 are configured to orient wing tip 22 in first orientation 102 when first actuator 220 and second actuator 230 are in respective first states 226 and 236. As illustrated in FIG. 3, first actuator 220 and second actuator 230 are configured to orient wing tip 22 in second orientation 104 when first actuator 220 and second actuator 230 are in respective second states 228 and 238. Moreover, first actuator 220 and second actuator 230 cooperate with linking member 202 such that second orientation 104 defines a complex rotation from first orientation 102 about first hinge line 210 and second hinge line 212, rather than a simple rotation about a single axis, such as axis 112. For example, in an embodiment, angle 110 is about 50 degrees, and wing tip 22 in second orientation 104 is rotated about 25 degrees about first hinge line 210 and about 25 degrees about second hinge line 212 from first orientation 102. It should be understood that an inner radius of curvature 262 of joint 100, 200 is increased relative to an inner radius of curvature (not shown) that would occur for a similar joint having a simple rotation about a single axis. As a result, a portion of flexible outer skin 60 defined by inner radius 262 is substantially smooth when wing tip 22 is moved between first orientation 102 and second orientation 104. For example, the portion of flexible outer skin 60 defined by inner radius 262 exhibits reduced or no creasing or folding when wing tip 22 is moved between first orientation 102 and second orientation 104.

Linking member 202 includes a surface 280 defined proximate the portion of flexible outer skin 60 defined by inner radius 262. In certain embodiments, surface 280 has a shape between first end 204 and second end 206 that enables joint 200 to position wing tip 22 in second orientation 104 without interference between linking member 202 and the portion of flexible outer skin 60 defined by inner radius 262. For example, in the illustrated embodiment, surface 280 has a curvature between first end 204 and second end 206 that substantially corresponds to inner radius of curvature 262. In an alternative embodiment, the curvature of surface 280 is greater than inner radius of curvature 262. In another alternative embodiment, surface 280 is substantially linear between first end 204 and second end 206, and at least one of first hinge line 210 and second hinge line 212 is offset towards the respective one of fourth pin joint 242 and third pin joint 240 sufficiently to enable joint 200 to position wing tip 22 in second orientation 104 without interference between linking member 202 and the portion of flexible outer skin 60 defined by inner radius 262. In other alternative embodiments, surface 280 has any other shape and configuration that enables joint 200 to function as described herein.

Figures 5, 6:
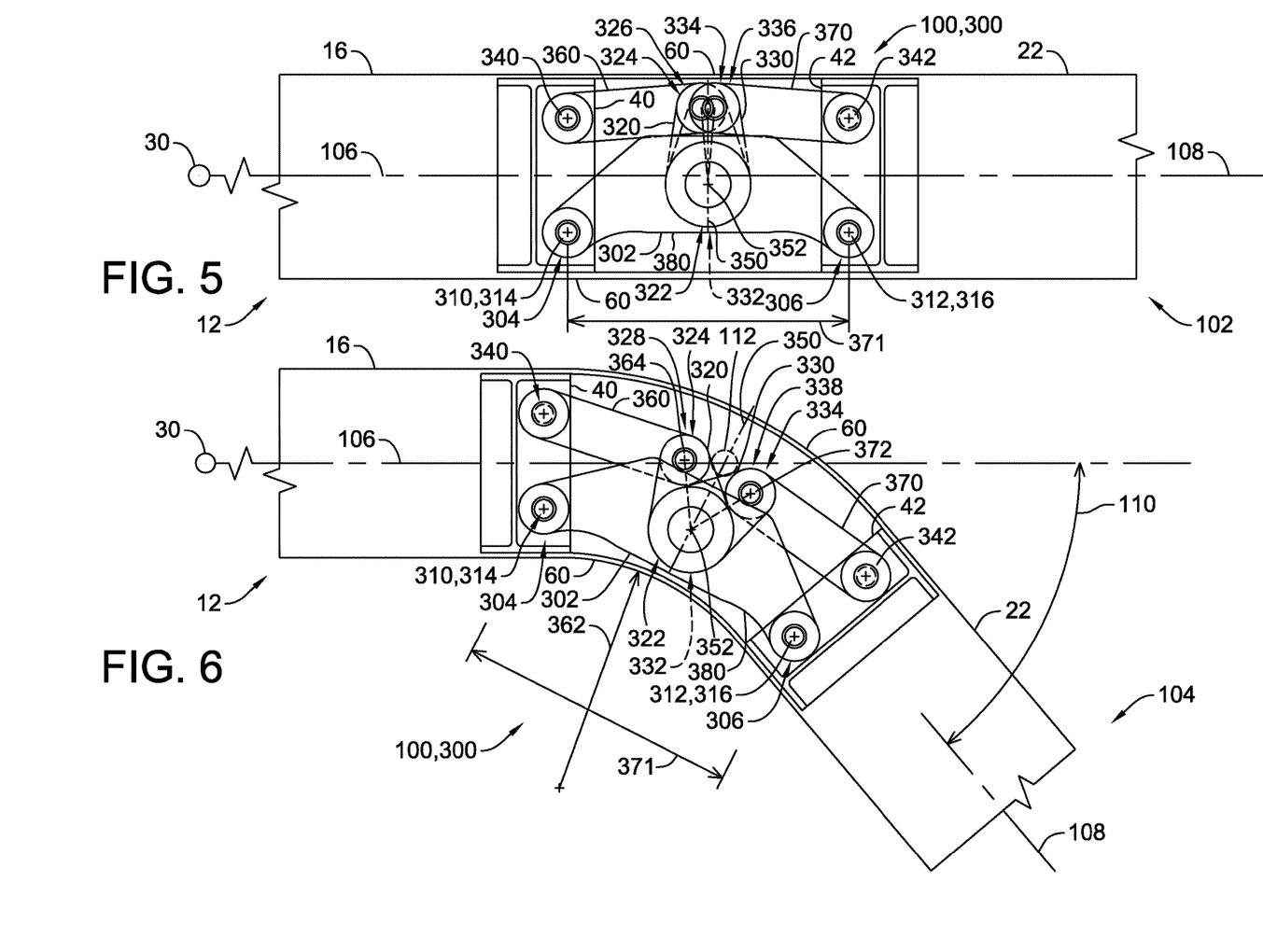
FIG. 5 is a schematic cross-sectional side view of a second embodiment of the wing tip joint that may be used with the aircraft shown in FIG. 1, with the wing tip in the first orientation.
FIG. 6 is a schematic cross-sectional side view of the second embodiment of the wing tip joint shown in FIG. 5, with the wing tip in the second orientation.
Figure 7:
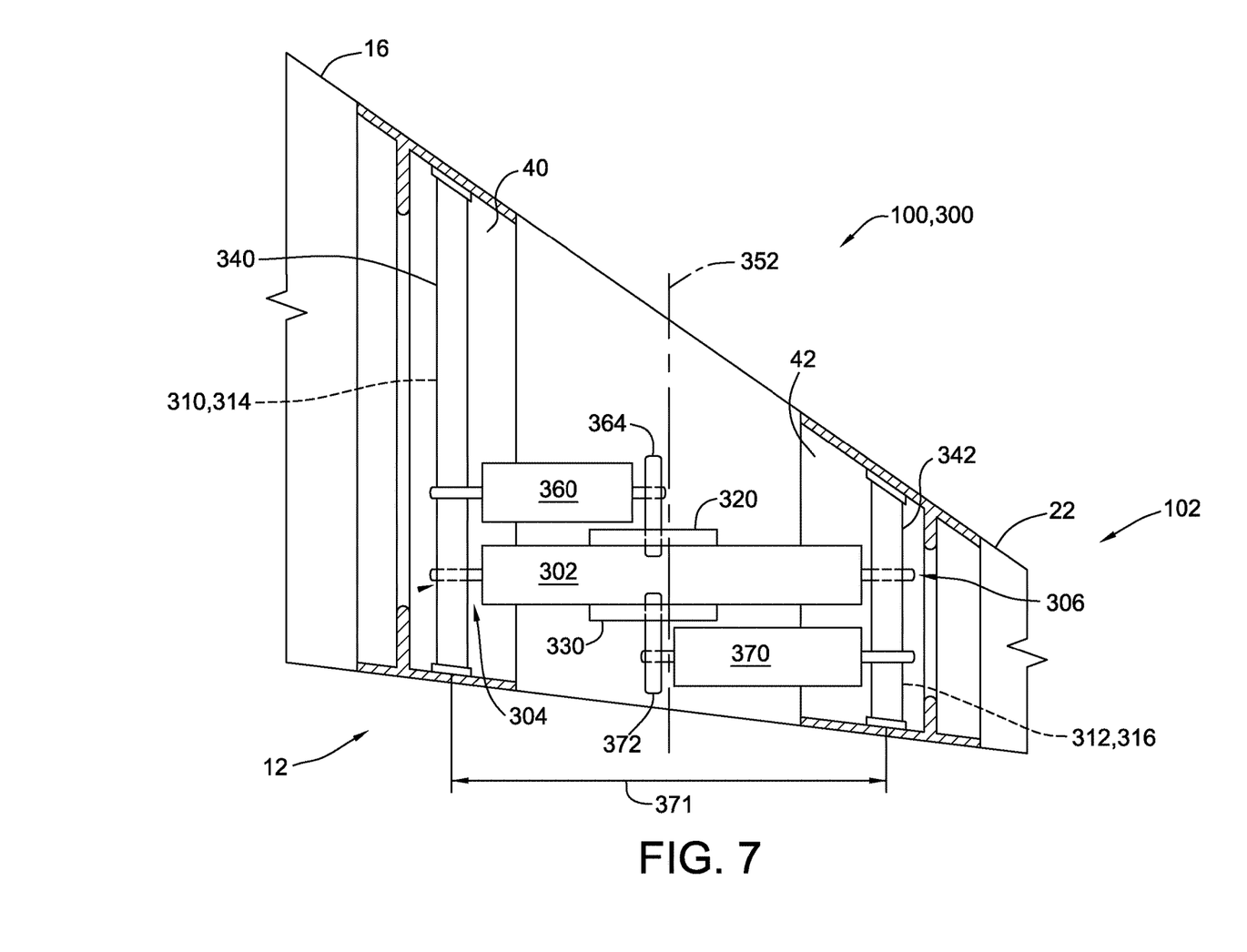
FIG. 7 is a schematic cross-sectional top view of the second embodiment of the wing tip joint shown in FIG. 5, with the wing tip in the first orientation.

FIG. 5 and FIG. 6 are schematic cross-sectional side views, and FIG. 7 is a schematic cross-sectional top view, of a second embodiment of wing tip joint 100, designated as wing tip joint 300, that may be used with, for example, aircraft 10. In FIG. 5 and FIG. 7, wing tip 22 is illustrated in first orientation 102 relative to wing base 16. In FIG. 6, wing tip 22 is illustrated in second orientation 104 relative to wing base 16. With reference to FIGS. 5-7, in the illustrated embodiment, first orientation 102 again is a neutral orientation, and second orientation 104 again has wing tip 22 rotated relative to first orientation 102 by angle 110 about axis 112. Angle 110 and axis 112 are as described above in the context of joint 200. In addition, wing tip 22 again is configured to rotate from first orientation 102 in a generally downward direction towards second orientation 104. In alternative embodiments, first orientation 102 is other than a neutral orientation, and/or wing tip 22 is configured to rotate from first orientation 102 in a generally upward direction towards second orientation 104. As with certain other embodiments of joint 100, joint 300 enables wing tip 22 to move between first orientation 102 and second orientation 104 other than by a simple rotation about a single axis, such as axis 112.

For example, in the illustrated embodiment, joint 300 includes a linking member 302. Linking member 302 extends from a first end 304 to a second end 306. Linking member first end 304 is configured to be coupled to wing base 16, and linking member second end 306 is configured to be coupled to wing tip 22. More specifically, in the illustrated embodiment, linking member first end 304 is rotatably coupled to rib 40 of wing base 16, and linking member second end 306 is rotatably coupled to rib 42 of wing tip 22. The rotatable coupling of linking member first end 304 to wing base 16 defines a first hinge line 310, and the rotatable coupling of linking member second end 306 to wing tip 22 defines a second hinge line 312.

First hinge line 310 and second hinge line 312 are substantially parallel and offset from each other by a distance 371. In particular, first hinge line 310 and second hinge line 312 each are substantially parallel to axis 112. In an embodiment, first hinge line 310 is a first pin joint 314 that rotatably couples linking member first end 304 to wing base 16, and second hinge line 312 is a second pin joint 316 that rotatably couples linking member second end 306 to wing tip 22. In alternative embodiments, first hinge line 310 and second hinge line 312 each are defined by any suitable coupling between linking member 302 and wing base 16 and wing tip 22, respectively, that enables joint 300 to function as described herein.

Joint 300 further includes a first actuator 320 and a second actuator 330 that are operable to rotate wing tip 22 about first hinge line 310 and second hinge line 312 between first orientation 102 and second orientation 104. First actuator 320 includes a first end 322, and a second end 324 that is rotatable relative to first end 322 about an actuator axis 352. In the illustrated embodiment, actuator axis 352 is substantially parallel to axis 112. The rotation of second end 324 relative to first end 322 is controllable, such as by a suitable control system (not shown) of aircraft 10 (shown in FIG. 1). Similarly, second actuator 330 includes a first end 332 and a second end 334 that is rotatable relative to first end 332 about actuator axis 352, and the rotation of second end 334 relative to first end 332 is controllable. Thus, in the illustrated embodiment, first actuator 320 and second actuator 330 are coaxially rotatable with respect to linking member 302. In alternative embodiments, each of first actuator 320 and second actuator 330 is rotatable about a separate respective actuator axis (not shown).

In an embodiment, each of first actuator 320 and second actuator 330 are hydraulic actuators. In another embodiment, at least one of first actuator 320 and second actuator 330 is a pneumatic actuator. In another embodiment, at least one of first actuator 320 and second actuator 330 is an electric actuator. In alternative embodiments, each of first actuator 320 and second actuator 330 is any suitable actuator that enables joint 300 to function as described herein.

In FIG. 5, first actuator 320 is illustrated in a first state 326 wherein first actuator second end 324 is at a first position relative to first actuator first end 322, and second actuator 330 is illustrated in a first state 336 wherein second actuator second end 334 is at a first position relative to second actuator first end 332. In FIG. 6, first actuator 320 is illustrated in a second state 328 wherein first actuator second end 324 is at a second position relative to first actuator first end 322, and second actuator second end 334 is illustrated in a second state 338 wherein second actuator second end 334 is at a second position relative to second actuator first end 332. In the illustrated embodiment, actuators 320 and 330 in respective second states 328 and 338 have respective second ends 324 and 334 that are oppositely rotated about actuator axis 352, away from a midline 350 of linking member 302 relative to respective first states 326 and 336.

Each of first actuator first end 322 and second actuator first end 332 is coupled, at least indirectly, to linking member 302. In the illustrated embodiment, each of first actuator first end 322 second actuator first end 332 is coupled to linking member 302 for rotation about actuator axis 352. Each of first actuator first end 322 and second actuator first end 332 is coupled to linking member 302 by any suitable coupling that enables joint 300 to function as described herein.

Additionally, first actuator second end 324 is coupled to wing base 16. In the illustrated embodiment, first actuator second end 324 is rotatably coupled to a first connecting member 360 at a fifth pin joint 364, and first connecting member 360 is rotatably coupled to rib 40 at a third pin joint 340. In alternative embodiments, first actuator second end 324 is coupled to wing base 16 by any suitable coupling that enables joint 300 to function as described herein. Similarly, second actuator second end 334 is coupled to wing tip 22. In the illustrated embodiment, second actuator second end 334 is rotatably coupled to a second connecting member 370 at a sixth pin joint 372, and second connecting member 370 is rotatably coupled to rib 42 at a fourth pin joint 342. In alternative embodiments, second actuator second end 334 is coupled to wing tip 22 by any suitable coupling that enables joint 300 to function as described herein.

As illustrated in FIG. 5, first actuator 320 and second actuator 330 are configured to orient wing tip 22 in first orientation 102 when first actuator 320 and second actuator 330 are in respective first states 326 and 336. As illustrated in FIG. 6, first actuator 320 and second actuator 330 are configured to orient wing tip 22 in second orientation 104 when first actuator 320 and second actuator 330 are in respective second states 328 and 338.

Moreover, first actuator 320 and second actuator 330 cooperate with linking member 302 such that second orientation 104 defines a complex rotation from first orientation 102 about first hinge line 310 and second hinge line 312, rather than a simple rotation about a single axis, such as axis 112. For example, in an embodiment, angle 110 is about 50 degrees, and wing tip 22 in second orientation 104 is rotated about 25 degrees about first hinge line 310 and about 25 degrees about second hinge line 312 from first orientation 102. It should be understood that an inner radius of curvature 362 of joint 100, 300 is increased relative to an inner radius of curvature (not shown) that would occur for a similar joint having a simple rotation about a single axis. As a result, a portion of flexible outer skin 60 defined by inner radius 362 is substantially smooth when wing tip 22 is moved between first orientation 102 and second orientation 104. For example, the portion of flexible outer skin 60 defined by inner radius 362 exhibits reduced or no creasing or folding when wing tip 22 is moved between first orientation 102 and second orientation 104.

Linking member 302 includes a surface 380 defined proximate the portion of flexible outer skin 60 defined by inner radius 362. In certain embodiments, surface 380 has a shape that enables joint 300 to position wing tip 22 in second orientation 104 without interference between linking member 302 and the portion of flexible outer skin 60 defined by inner radius 362. For example, in the illustrated embodiment, surface 380 proximate each of first end 304 and second end 306 is curved towards actuator axis 352. In an alternative embodiment, surface 380 is substantially linear between first end 304 and second end 306, and at least one of first hinge line 310 and second hinge line 312 is offset towards the respective one of third pin joint 340 and fourth pin joint 342 sufficiently to enable joint 300 to position wing tip 22 in second orientation 104 without interference between linking member 302 and the portion of flexible outer skin 60 defined by inner radius 362. In other alternative embodiments, surface 380 has any other shape and configuration that enables joint 300 to function as described herein.

Figure 8:
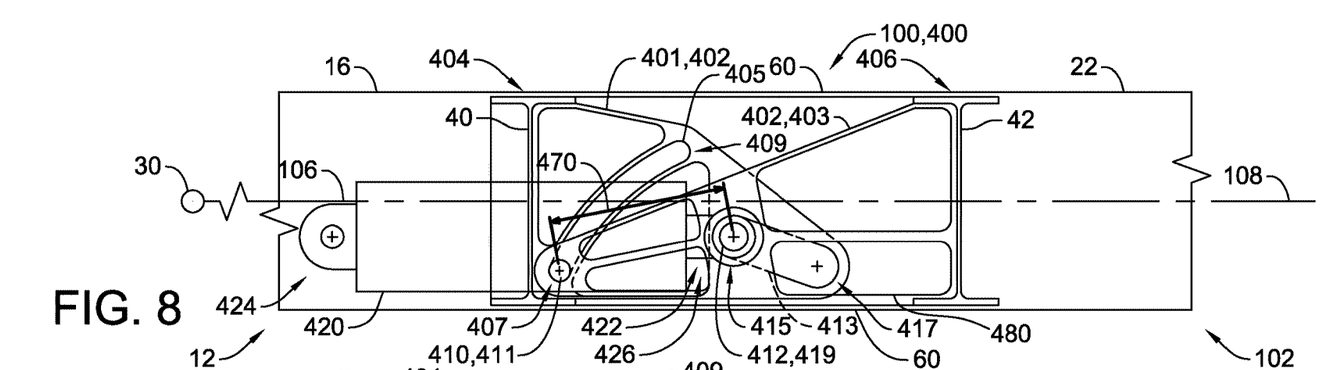
FIG. 8 is a schematic cross-sectional side view of a third embodiment of the wing tip joint that may be used with the aircraft shown in FIG. 1, with the wing tip in the first orientation.
Figure 9:
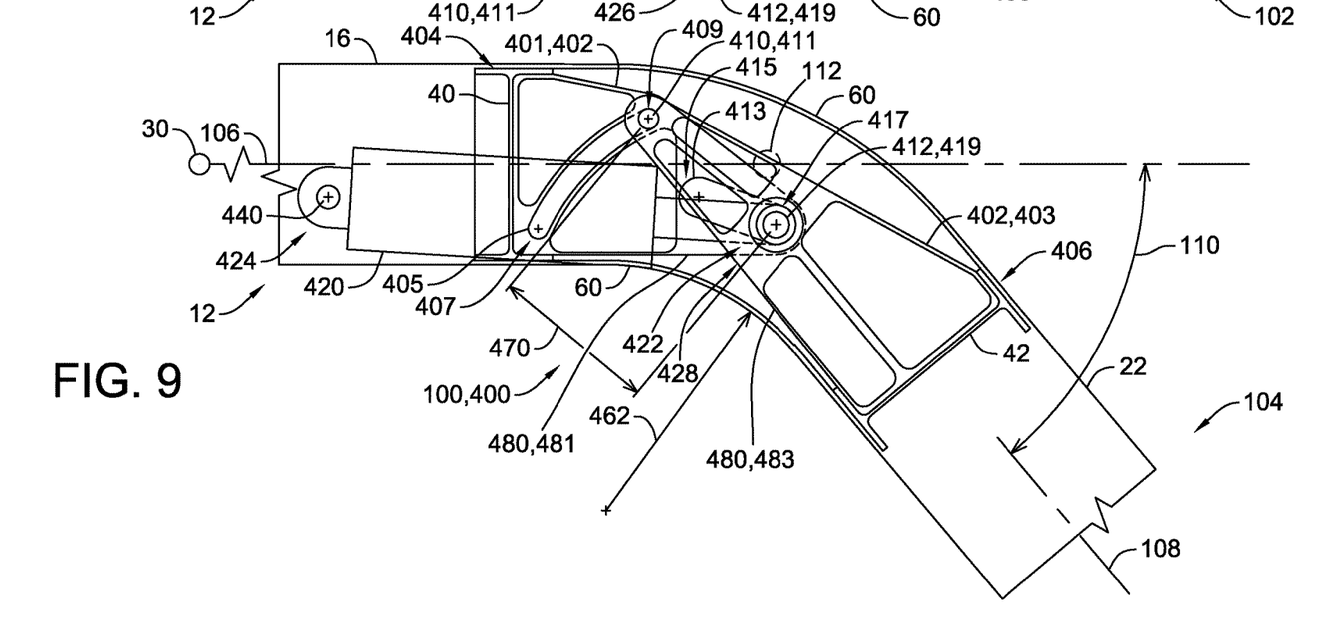
FIG. 9 is a schematic cross-sectional side view of the third embodiment of the wing tip joint shown in FIG. 8, with the wing tip in the second orientation.
Figure 10:
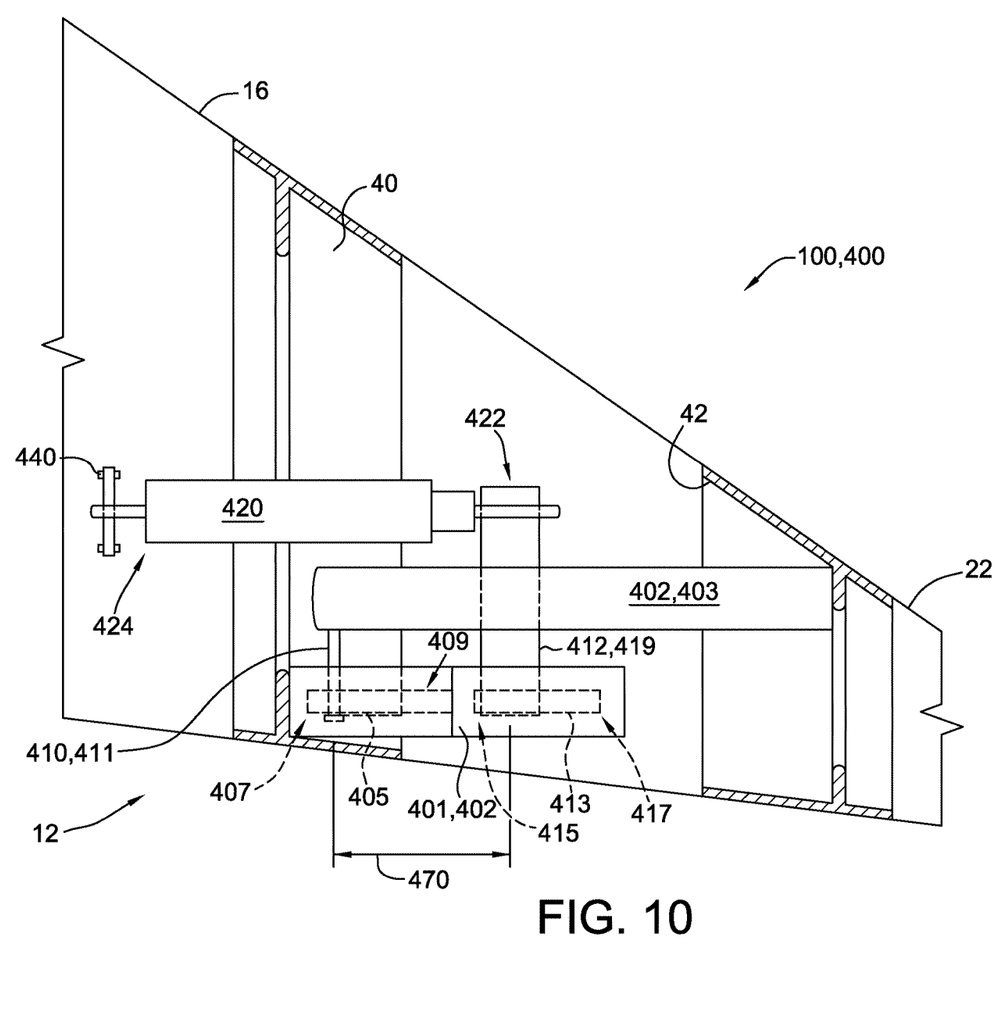
FIG. 10 is a schematic cross-sectional top view of the third embodiment of the wing tip joint shown in FIG. 8, with the wing tip in the first orientation.

FIG. 8 and FIG. 9 are schematic cross-sectional side views, and FIG. 10 is a schematic cross-sectional top view, of a third embodiment of wing tip joint 100, designated as wing tip joint 400, that may be used with, for example, aircraft 10. In FIG. 8 and FIG. 10, wing tip 22 is illustrated in first orientation 102 relative to wing base 16. In FIG. 9, wing tip 22 is illustrated in second orientation 104 relative to wing base 16. With reference to FIGS. 8-10, in the illustrated embodiment, first orientation 102 again is a neutral orientation, and second orientation 104 again has wing tip 22 rotated relative to first orientation 102 by angle 110 about axis 112. Angle 110 and axis 112 are as described above in the context of joints 200 and 300. In addition, wing tip 22 again is configured to rotate from first orientation 102 in a generally downward direction towards second orientation 104. In alternative embodiments, first orientation 102 is other than a neutral orientation, and/or wing tip 22 is configured to rotate from first orientation 102 in a generally upward direction towards second orientation 104. As with certain other embodiments of joint 100, joint 400 enables wing tip 22 to move between first orientation 102 and second orientation 104 other than by a simple rotation about a single axis, such as axis 112.

For example, in the illustrated embodiment, joint 400 includes a linking member 402. Linking member 402 extends from a first end 404 to a second end 406. More specifically, in the illustrated embodiment, linking member first end 404 is defined on a first portion 401 of linking member 402, and linking member second end 406 is defined on a second portion 403 of linking member 402. Linking member first end 404 is configured to be coupled to wing base 16, and linking member second end 406 is configured to be coupled to wing tip 22. More specifically, in the illustrated embodiment, linking member first portion 401 is fixedly coupled at first end 404 to rib 40 of wing base 16, and linking member second portion 403 is fixedly coupled at second end 406 to rib 42 of wing tip 22.

A first slot 405 defined in linking member first portion 401 extends from a first end 407 to a second end 409. First slot 405 is configured to receive a first pin 411 that extends from linking member second portion 403, such that first pin 411 is constrained to move within first slot 405. A second slot 413 defined in linking member first portion 401 extends from a first end 415 to a second end 417. Second slot 413 is configured to receive a second pin 419 that extends from linking member second portion 403, such that second pin 419 is constrained to move within second slot 413.

A position of first pin 411 in first slot 405, and a corresponding position of second pin 419 in second slot 413, defines a corresponding rotation of linking member second portion 403 relative to linking member first portion 401. First pin 411 defines a first hinge line 410, and second pin 419 defines a second hinge line 412. In alternative embodiments, at least one of first hinge line 410 and second hinge line 412 is defined by any other suitable coupling between linking member first portion 401 and linking member second portion 403 that enables joint 400 to function as described herein. First hinge line 410 and second hinge line 412 are substantially parallel and offset from each other by a distance 470. In particular, first hinge line 410 and second hinge line 412 each are substantially parallel to axis 112.

Joint 400 further includes a first actuator 420 that is operable to rotate wing tip 22 about first hinge line 410 and second hinge line 412 between first orientation 102 and second orientation 104. First actuator 420 includes a second end 424, and a first end 422 that is linearly extendable relative to second end 424. The extension of first end 422 relative to second end 424 is controllable, such as by a suitable control system (not shown) of aircraft 10 (shown in FIG. 1). In FIG. 8, first actuator 420 is illustrated in a first state 426 wherein first actuator second end 424 is at a first position relative to first actuator first end 422. In FIG. 9, first actuator 420 is illustrated in a second state 428 wherein first actuator second end 424 is at a second position relative to first actuator first end 422. In the illustrated embodiment, first actuator 420 in second state 428 has first end 422 extended relative to first state 426.

First actuator first end 422 is coupled, at least indirectly, to linking member 402. More specifically, in the illustrated embodiment, first actuator first end 422 is rotatably coupled to second pin 419, such that first actuator first end 422 is at least indirectly coupled to linking member 402 through second hinge line 412. In an alternative embodiment, first actuator first end 422 is coupled to linking member 402 at a separate pin joint (not shown) that has an axis of rotation substantially parallel to second pin 419. In other alternative embodiments, first actuator first end 422 is coupled to linking member 402 by any suitable coupling that enables joint 400 to function as described herein. Additionally, first actuator second end 424 is coupled to one of wing base 16 and wing tip 22. In the illustrated embodiment, first actuator second end 424 is rotatably coupled to wing base 16 at a third pin joint 440. In other alternative embodiments, first actuator second end 424 is coupled to one of wing base 16 and wing tip 22 by any suitable coupling that enables joint 400 to function as described herein.

As illustrated in FIG. 8, first actuator 420 is configured to orient wing tip 22 in first orientation 102 when first actuator 420 is in first state 426. As illustrated in FIG. 9, first actuator 420 is configured to orient wing tip 22 in second orientation 104 when first actuator 420 is in second state 428.

Moreover, first actuator 420 cooperates with linking member 402 such that second orientation 104 defines a complex rotation from first orientation 102 about first hinge line 410 and second hinge line 412, rather than a simple rotation about a single axis, such as axis 112. For example, in an embodiment, angle 110 is about 50 degrees, and wing tip 22 in second orientation 104 is rotated about 25 degrees about first hinge line 410 and about 25 degrees about second hinge line 412 from first orientation 102. It should be understood that an inner radius of curvature 462 of joint 100, 400 is increased relative to an inner radius of curvature (not shown) that would occur for a similar joint having a simple rotation about a single axis. As a result, a portion of flexible outer skin 60 defined by inner radius 462 is substantially smooth when wing tip 22 is moved between first orientation 102 and second orientation 104. For example, the portion of flexible outer skin 60 defined by inner radius 462 exhibits reduced or no creasing or folding when wing tip 22 is moved between first orientation 102 and second orientation 104.

Linking member 402 includes a surface 480 defined proximate the portion of flexible outer skin 60 defined by inner radius 462. In certain embodiments, surface 480 has a shape that enables joint 400 to position wing tip 22 in second orientation 104 without interference between linking member 402 and the portion of flexible outer skin 60 defined by inner radius 462. For example, in the illustrated embodiment, surface 480 includes a first portion surface 481 defined on first portion 401, and a second portion surface 483 defined on second portion 403. As first portion 401 and second portion 403 rotate relative to first and second hinge lines 410 and 412, first portion surface 481 and second portion surface 483 cooperate to avoid interference between linking member 402 and the portion of flexible outer skin 60 defined by inner radius 462. In other alternative embodiments, surface 480 has any other shape and configuration that enables joint 400 to function as described herein.

Figure 11:
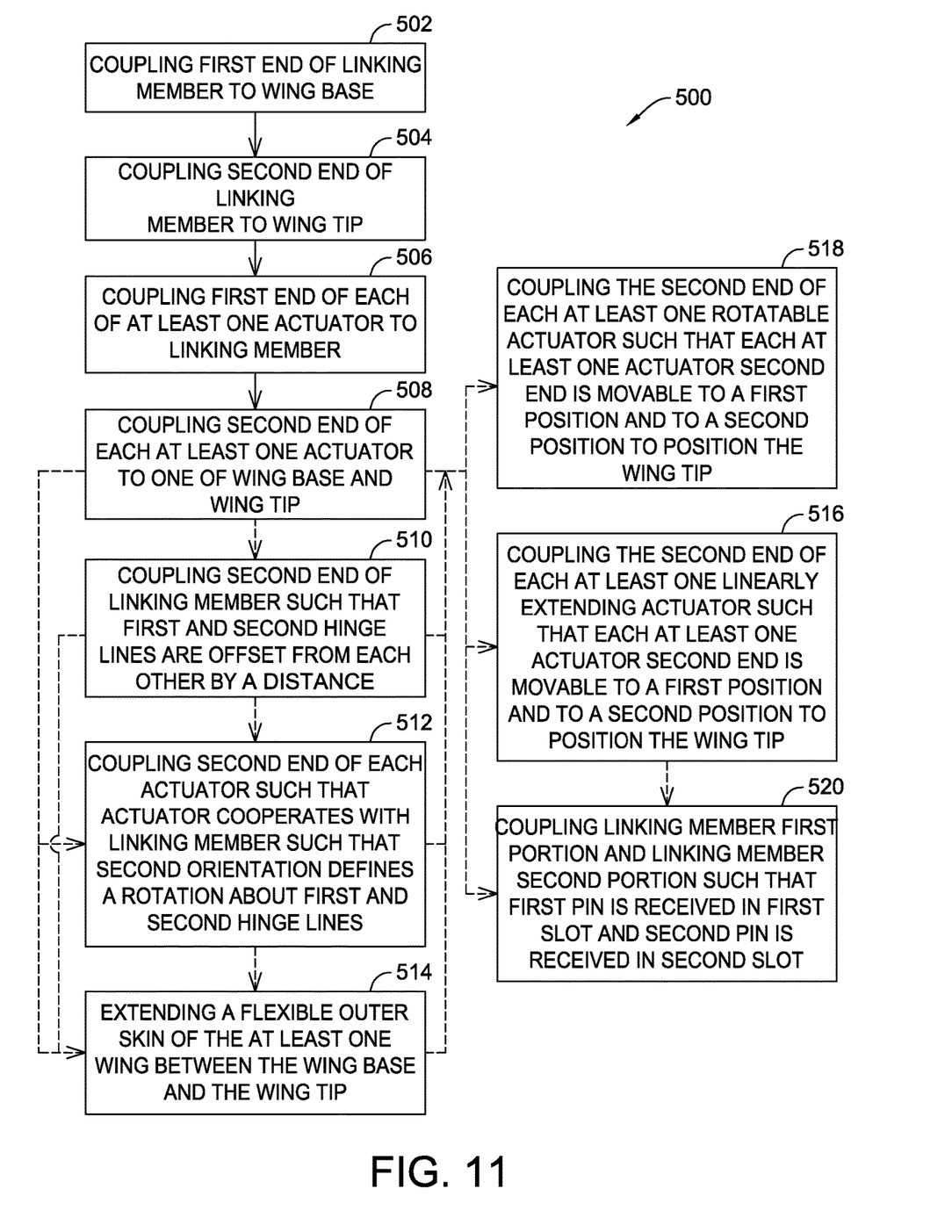
FIG. 11 is a flowchart of an embodiment of a method of coupling a wing tip and a wing base, such as the wing tip and wing base shown in FIGS. 1-10.

FIG. 11 is a flowchart of an embodiment of a method 500 of coupling a wing tip, such as wing tip 22, and a wing base, such as wing base 16. With reference to FIGS. 1-11, method 500 includes coupling 502 a first end of a linking member, such as linking member 202, 302, or 402, to the wing base, and coupling 504 a second end of the linking member to the wing tip. The linking member defines a first hinge line, such as first hinge line 210, 310, or 410, and a second hinge line, such as second hinge line 212, 312, or 412. The first hinge line and the second hinge line are substantially parallel. Method 500 also includes coupling 506 a first end of each of at least one actuator, such as first actuator 220, 320, or 420 and/or second actuator 230 or 330, to the linking member. Method 500 further includes coupling 508 a second end of each at least one actuator to one of the wing base and the wing tip. The at least one actuator is operable to rotate the wing tip about the first and second hinge lines between a first orientation, such as first orientation 102, and a second orientation, such as second orientation 104, relative to the wing base.

In certain embodiments, method 500 also includes one or more additional steps, which are linked by dashed lines in FIG. 11. For example, in certain embodiments, method 500 includes coupling 510 the second end of the linking member such that the first and second hinge lines are offset from each other by a distance, such as distance 270, 371, or 470. In some embodiments, method 500 further includes coupling 512 the second end of each at least one actuator such that the at least one actuator cooperates with the linking member such that the second orientation defines a rotation from the first orientation about the first and second hinge lines. Moreover, in certain embodiments, method 500 includes extending 514 a flexible outer skin, such as flexible outer skin 60, between the wing base and the wing tip. A portion of the flexible outer skin defined by an inner radius, such as inner radius 262, 362, or 462, is substantially smooth when the wing tip is moved between the first orientation and the second orientation.

Additionally, in certain embodiments, each at least one actuator second end, such as first actuator second end 224 or 424 or second actuator second end 234, is linearly extendable relative to the at least one actuator first end, such as first actuator first end 222 or 422 or second actuator first end 232. In some such embodiments, method 500 includes coupling 516 the second end of each at least one actuator such that each at least one actuator second end is movable to a first position relative to the at least one actuator first end to position the wing tip in the first orientation, and each at least one actuator second end is movable to a second position relative to the at least one actuator first end to position the wing tip in the second orientation.

Moreover, in certain embodiments, each at least one actuator second end, such as first actuator second end 324 or second actuator second end 334, is rotatable relative to the at least one actuator first end, such as first actuator first end 322 or second actuator first end 332, about an actuator axis, such as actuator axis 352. In some such embodiments, method 500 includes coupling 518 the second end of each at least one actuator such that each at least one actuator second end is movable to a first position relative to the at least one actuator first end to position the wing tip in the first orientation, and each at least one actuator second end is movable to a second position relative to the at least one actuator first end to position the wing tip in the second orientation.

Further, in certain embodiments, the linking member first end is defined on a first portion, such as first portion 401, of the linking member and the linking member second end is defined on a second portion, such as second portion 403, of the linking member. The linking member first portion includes a first slot, such as first slot 405, and a second slot, such as second slot 413. The linking member second portion includes a first pin, such as first pin 411, that defines the first hinge line, and a second pin, such as second pin 419, that defines the second hinge line. In some such embodiments, method 500 includes coupling 520 the linking member first portion and the linking member second portion such that the first pin is received in the first slot and the second pin is received in the second slot.

Each of the processes of method 500 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a wing tip joint and method for coupling a wing tip to a wing base. The embodiments provide a wing tip joint configured to rotate the wing tip about two offset, substantially parallel hinge lines, rather than about a single axis. As such, a flexible skin that extends between the wing base and the wing tip maintains a relatively large radius of curvature when the wing tip is in a rotated state.

The embodiments described herein provide improvements over at least some known rotatable wing tips. As compared to at least some known rotatable wing tips, embodiments of the wing tip joint described herein provide for reduced or eliminated creases and wrinkles in the flexible skin near the hinge mechanism. The reduction or elimination of creases and wrinkles facilitates a reduced adverse aerodynamic effect proximate the hinge mechanism, and thus facilitates more efficient operation of an associated aircraft.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A joint for coupling a wing tip to a wing base, said joint comprising:
    a linking member that extends from a first end to a second end, said linking member first end is coupleable to the wing base, said linking member second end is coupleable to the wing tip, said linking member defines a first hinge line and a second hinge line, said first hinge line and said second hinge line are substantially parallel; and
    at least two actuators, a first end of each of said at least two actuators is coupled to said linking member, a second end of each of said at least two actuators is coupleable to one of the wing base and the wing tip, said at least two actuators are operable to rotate the wing tip about said first and second hinge lines between a first orientation and a second orientation relative to the wing base, wherein:
    said second end of a first actuator of said at least two actuators is rotatable relative to said first end of said first actuator about an actuator axis, and said second end of a second actuator of said at least two actuators is rotatable relative to said first end of said second actuator about the actuator axis;

said second end of said first actuator is movable to a first position relative to said first end of said first actuator, and said second end of said second actuator is movable to a first position relative to said first end of said second actuator, to position the wing tip in the first orientation; and said second end of said first actuator is movable to a second position relative to said first end of said first actuator, and said second end of said second actuator is movable to a second position relative to said first end of said second actuator, to position the wing tip in the second orientation.

2. The joint according to claim 1, wherein said first and second hinge lines are offset from each other by a distance.

3. The joint according to claim 1, wherein said at least two actuators cooperate with said linking member such that the second orientation defines a rotation from the first orientation about said first and second hinge lines.

4. A method of coupling a wing tip and a wing base, said method comprising:
coupling a first end of a linking member to the wing base;
coupling a second end of the linking member to the wing tip, wherein the linking member defines a first hinge line and a second hinge line, the first hinge line and the second hinge line are substantially parallel;
coupling a first end of each of at least two actuators to the linking member; and
coupling a second end of each of the at least two actuators to one of the wing base and the wing tip, wherein the at least two actuators are operable to rotate the wing tip about the first and second hinge lines between a first orientation and a second orientation relative to the wing base, wherein the second end of each of the at least two actuators is rotatable relative to the first end of the corresponding one of the at least two actuators about an actuator axis.

5. The method according to claim 4, further comprising coupling the second end of the linking member such that the first and second hinge lines are offset from each other by a distance.

6. The method according to claim 4, further comprising coupling the second end of each of the at least two actuators such that the at least two actuators cooperate with the linking member such that the second orientation defines a rotation from the first orientation about the first and second hinge lines.

7. The method according to claim 4, further comprising extending a flexible outer skin between the wing base and the wing tip, wherein a portion of the flexible outer skin defined by an inner radius is substantially smooth when the wing tip is moved between the first orientation and the second orientation.

8. The method according to claim 4, wherein said method further comprises coupling the second end of each of the at least two actuators such that:
the second end of each of the at least two actuators is movable to a first position relative to the first end of the corresponding one of the at least two actuators to position the wing tip in the first orientation; and
the second end of each of the two actuators is movable to a second position relative to the first end of the corresponding one of the at least two actuators to position the wing tip in the second orientation.

9. An aircraft comprising:
at least one wing comprising a wing base and a wing tip;
a linking member that extends from a first end to a second end, said linking member first end is coupled to said wing base, said linking member second end is coupled to said wing tip, said linking member defines a first hinge line and a second hinge line, said first hinge line and said second hinge line are substantially parallel; and
at least two actuators, a first end of each of said at least two actuators is coupled to said linking member, a second end of each of said at least two actuators is coupled to one of said wing base and said wing tip, said at least two actuators are operable to rotate said wing tip about said first and second hinge lines between a first orientation and a second orientation relative to said wing base, wherein said second end of each of said at least two actuators is rotatable relative to said first end of the corresponding one of said at least two actuators about an actuator axis.

10. The aircraft according to claim 9, wherein said first and second hinge lines are offset from each other by a distance.

11. The aircraft according to claim 9, wherein said at least two actuators cooperate with said linking member such that the second orientation defines a rotation from the first orientation about said first and second hinge lines.

12. The aircraft according to claim 9, further comprising a flexible outer skin between said wing base and said wing tip, wherein a portion of said flexible outer skin defined by an inner radius is substantially smooth when said wing tip is moved between the first orientation and the second orientation.

13. The aircraft according to claim 12, wherein said linking member further comprises a surface oriented towards said portion of said flexible outer skin defined by said inner radius, said surface being shaped to avoid interference between said linking member and said portion of said flexible outer skin when said wing tip is positioned in the second orientation.

14. The aircraft according to claim 13, wherein said surface is curved proximate each of said linking member first end and said linking member second end.

15. The aircraft according to claim 9, wherein:
said second end of each of said at least two actuators is movable to a first position relative to said first end of said corresponding one of said at least two actuators to position said wing tip in the first orientation; and
said second end of each of said at least two actuators is movable to a second position relative to said first end of said corresponding one of said at least two actuators to position said wing tip in the second orientation.

16. The aircraft according to claim 9, wherein an angle is defined between the first orientation and the second orientation, said actuators are further operable to rotate said wing tip relative to said wing base such that the angle is divided into two equal rotations about said first and second hinge lines.

17. The joint according to claim 1, wherein said linking member further comprises a surface oriented to face a flexible outer skin between the wing base and the wing tip, said surface being shaped to avoid interference between said linking member and the flexible outer skin when the joint positions the wing tip in the second orientation.

18. The joint according to claim 17, wherein said surface is curved proximate each of said linking member first end and said linking member second end.

19. The method according to claim 4, wherein coupling the first end of each of the at least two actuators to the linking member further comprises coupling the first ends to the linking member having a surface oriented to face a flexible outer skin between the wing base and the wing tip, the surface being shaped to avoid interference between the linking member and the flexible outer skin when the wing tip is positioned in the second orientation.

20. The method according to claim 19, wherein coupling the first end of each of the at least two actuators to the linking member further comprises coupling the first ends to the linking member having the surface being curved proximate each of the linking member first end and the linking member second end.

\* \* \* \* \*

UNITED STATES PATENT AND TRADEMARK OFFICE
CERTIFICATE OF CORRECTION

PATENT NO. : 10,759,521 B2
APPLICATION NO. : 15/675954
DATED : September 1, 2020
INVENTOR(S) : Timothy James McMahon et al.

Page 1 of 1

It is certified that error appears in the above-identified patent and that said Letters Patent is hereby corrected as shown below:

In the Claims

Column 13, Line 64, Claim 8, delete "each of the two actuators" and insert therefor -- each of the at least two actuators --.

Signed and Sealed this
Twenty-ninth Day of December, 2020

Andrei Iancu
*Director of the United States Patent and Trademark Office*